United States Patent [19]
Wiitala et al.

[11] Patent Number: 6,122,622
[45] Date of Patent: Sep. 19, 2000

[54] COMPUTER AIDED SYSTEM FOR COMPLIANCE WITH CHEMICAL CONTROL LAWS

[75] Inventors: Keith William Wiitala, Woodbury; David Philip Swanson, Minneapolis; Joseph James Purdes, Champlin, all of Minn.

[73] Assignee: H. B. Fuller, St. Paul, Minn.

[21] Appl. No.: 09/025,232

[22] Filed: Feb. 18, 1998

[51] Int. Cl.[7] .................................................. G06F 17/60
[52] U.S. Cl. .............................. 705/28; 705/9; 264/400; 264/468.01
[58] Field of Search ..................... 705/1, 9, 28; 364/400, 364/468.01; 700/95

[56] References Cited

U.S. PATENT DOCUMENTS

| | | | |
|---|---|---|---|
| 5,664,112 | 9/1997 | Sturgeon et al. | 705/28 |
| 5,726,884 | 3/1998 | Sturgeon et al. | 705/9 |

FOREIGN PATENT DOCUMENTS

| | | | |
|---|---|---|---|
| 0572171A2 | 12/1993 | European Pat. Off. | G06F 15/20 |
| 23011915 | 12/1996 | United Kingdom . | |
| WO93/18466 | 9/1993 | WIPO | G06F 15/21 |

OTHER PUBLICATIONS

Judith Markowitz, "Using Smart Systems to Save the Environment"; AI Expert; pp. 32–38, Nov. 1994.

HazMat Transport News; "Reference Materials and Software"; v. 13, No. 11, May 25, 1992.

Hazardous Waste News; "Business & Technology"; v. 15, No. 47, Dec. 7, 1993.

Toxic Materials News; "Toxic Materials News"; v. 20, No. 28, Jul. 14, 1993.

US Rail News; "Gaia Systems, Menlo Park, Calif., released its ChemCheck software program"; v. 15, No. 12, Jun. 10, 1992.

Online Newsletter; "Technical Database Services, Inc. Offers Specialized Databases"; v. 14, No. 11, Nov. 1993.

News Release; "New Software Program from Gaia Systems Matches Chemicals and Regulations", Nov. 4, 1991.

IBM Technical Disclosure Bulletin, May 1988, US, "Chemical Inventory/Control Systems".

O'Connor et al., "An Information Lifeline to the Disaster Area," pp. 838–841.

Proceedings of the 1993 IEEE International Symposium on Electronics and the Environment, May 10–12, 1993.

Mukand et al., "Implementing a Facility–Customized Air Information Management System for Title V Permit Development and Management (A*I*M*S–Title V): Practical Experiences," pp. 1–11.

*Primary Examiner*—James P. Trammell
*Assistant Examiner*—Demetra R. Smith
*Attorney, Agent, or Firm*—Jack V. Musgrove

[57] ABSTRACT

An automated system of integrated computer programs and files facilitates compliance with Chemical Control Laws of different jurisdictions. In one embodiment, the system uses a raw material database file, a formula database file, a manufacturing status database file, a sales status database file, a regulatory worksheet program, and an update program, all residing on a computer system. These files and programs are collectively used to: maintain Chemical Control Law inventories; maintain records of chemical and product Chemical Control Law registrations; provide a basis for automated control of chemical or product manufacturing, distribution, importing and exporting through the generation of country or regional manufacturing and sales status; generate certification letters; generate Chemical Control Law manufacturing and sales statuses for particular countries or regions of the world; and provide real-time updating of a chemical's or product's manufacturing and sales status.

20 Claims, 11 Drawing Sheets

*TISPG100*  12/14/97  FORMULA ENTRY INTERFACE  13:11:28
KWIITALA
Country: USA
Facility: 164
    Product #: _ZZ-0001_  Id:_A_Md:___ Visc:___ Col:___

___ All types of maintenance
        ___ Product information
        ___ Formula
        ___ Components (CAS#, PMN, etc.)
        ___ Product Comments (Text)
        ___ Physical Properties
        ___ Applications
        ___ Fill Numbers
        ___ Technical Data Sheets
        _X_ Regulatory Worksheet <HELP>=Help  <CMD1>=Exit  <CMD6>=Messages
<CMD10>=Transfer  <CMD11>=Delete  <CMD12>=Submit for approval

*Fig. 3*

*TISPG287*     MANUFACTURING STATUS FILE INTERFACE     12/14/97
KWIITALA     13:22:03

Type (CAS, etc) .. CAS
Component Nbr ... 24937-78-8

Acetic acid ethenyl ester, polymer with ethene

| | | |
|---|---|---|
| USA TSCA...: | Mfg Y | TSCA Inventory: Preferred Name File, May 1, 1994 |
| Canada DSL.: | Mfg Y | CEPA Domestic Substance List (DSL), circa 1993 |
| Europe EINECS: | Mfg Y | 12/11/96 STN Search |
| Japan ENCS: | Mfg Y | 12/16/96 STN Search |
| Australia AICS: | Mfg Y | Australian (AICS) Inventory, circa 1994 |
| Korea ECL.: | Mfg Y | KTSCA number 4-152 |
| Philippines (PICCS): | Mfg U | |
| New Zealand: | Mfg U | |
| China..: | Mfg U | |

F1=Exit            F2=Cancel

*Fig. 3a*

*TISPG288*   PRODUCT SALES STATUS FILE INTERFACE
KWIITALA

Product Number....: ZZ 0005 A
Description......: TRAINING FORMULA

| Country | Mfg | Sales | Description |
|---|---|---|---|
| USA TSCA...: | Y | Y | System Calculated |
| Canada DSL.: | Y | Y | System Calculated |
| Europe EINECS: | Y | Y | Status now "Y" due to change in CAS 7732-18-5 |
| Japan ENCS: | N | N | System Calculated |
| Korea TCCL: | N | N | System Calculated |
| Australia AICS: | N | N | System Calculated |
| Philippines (PICCS): | N | Y | Product registration complete on 1/1/95. |
| New Zealand: | N | N | System Calculated |
| China..: | | | |

<HELP>=Help  <CMD1>=Exit  <CMD2>=Return  <CMD6>=Messages

*Fig. 36*

*TISPG280*                                                                12/14/97
KWIITALA                                                                  13:04:52

REGULATORY WORKSHEET
                               ZZ 0005 A

Formula    %     Reactive  Amount   Charged    Inc
Seq RM #   Description    Amount    Act    Amount    Reacted  Weight%   Weight%
1 010304   VINYL ACETATE(C 18.4829  100.0  18.4829   18.4829  73.9316   73.9316
2 130044   ETHYLENE DICHLOR 12.1987 100.0  12.1987   12.1987  24.3974   24.3974
3 010304   VINYL ACETATE(C 18.4829  100.0  18.4829   18.4829   .0000     .0000
4 010003   GLACIAL ACRYLIC   .8355  100.0    .8355     .8355  1.6710    1.6710
5 210107   WATER           50.0000  100.0  50.0000     .0000   .0000     .0000
           Wt. Loss %: .0000        Number of reaction products? 1    Is this a polymer? Y Reaction Product(s) Regulatory Status
: 1 Comp.: CAS 24937-78-8 Name: Acetic acid ethenyl ester, polymer with et
ene
                                              +
USA TSCA.. MFG Y SALE Y Ref System Calculated
Comment:

Regulatory Status (Y/N/U)
USA TSCA.. MFG Y SALE Y   Canada DSL MFG Y SALE Y   Europe EINEC MFG Y SALE Y
Japan ENCS MFG N SALE N   Australia AICS MFG N SALE N   Korea ECL MFG N SALE N +

F1=Exit  F2=Prev  F4=Lookup  F10=RM Status        F12=Print

*TISPG200*
KWIITALA

RAW MATERIAL INFORMATION FILE DISPLAY

RM #: 13-0311     RM Desc: HEXANE (ASHLAND)
Status: A     Generic #: 610-4000     RM Spec:
Hazard: 999     Foreign X-Ref #:     Primary CAS #: 110-54-3
                                     TSCA status: REGISTERED Supplier: ASHLAND CHEMICAL, INC.
Address1: P.O. BOX 2219
Address2:
City: COLUMBUS   OH   Zip: 43216
Phone Number: 614-889-3333

Prim Prod Type: SOL
Country Code: USA
Requester: HUNT_M
Date Requested: 11/02/92        FDA175.105:  176.170:  175.300:
Date Last Change: 6/04/97       Activity Percentage: 100.0
Chem Desc: HEXANE Regulatory Status (Y/N/U)   last change 1997-06-04
USA TSCA: MFG Y SALE Y   CAN DSL..: MFG Y SALE Y   EUROPE EINECS: MFG Y SALE Y
Japan ENCS: MFG U SALE U   Australia AICS.: MFG U SALE U   KOREA...: MFG Y SALE Y +

<HELP>=Help  <CMD1>=Exit  <CMD2>=Previous                    <CMD6>=Messages

| | Raw Material (RM) # | RM Description | Percent Reactive | ... |
|---|---|---|---|---|
| Record #1 | 26-0012 | Benzene | 100 | |
| Record #2 | 29-0034 | Acetone | 100 | |
| Record #3 | 30-0101 | Formaldehyde | 99 | |
| ... | | | | |

Fig. 6

| | Product # | Sequence # | RM # | Percent of RM | ... |
|---|---|---|---|---|---|
| Record #1 | NP-4038 | 1 | 26-0012 | 50 | |
| Record #2 | NP-4038 | 2 | 29-0034 | 50 | |
| Record #3 | NP-2068 | 1 | 30-0101 | 100 | |
| ... | | | | | |

| Chemical Name | Type | Registration # | RM # | Product # | Mfg Status #1 | Mfg Status #2 | Mfg Status #3 |
|---|---|---|---|---|---|---|---|
| Raw Material | | | 27-0002 | | Y | N | N |
| Chemical | CAS | 50-00-0 | | | Y | Y | Y |
| Chemical | ACC | P-93-93 | | | Y | N | N |
| Finish Goods | | | | NP-4038 | N | N | N |
| Premix | | | 26-0001 | NP-4038 | Y | Y | Y |

Fig. 7

| | Chemical Name | Type | Registration # | RM # | Product # | Sale Status #1 | Sale Status #2 | Sale Status #3 |
|---|---|---|---|---|---|---|---|---|
| Raw Material | | | | 27-0002 | | Y | N | N |
| Chemical | Formaldehyde | CAS | 50-00-0 | | | Y | Y | Y |
| Chemical | Ethylene homopolymer | ACC | P-93-93 | | | Y | N | N |
| Finish Goods | | | | | NP-4038 | N | N | N |
| Premix | | | | 26-0001 | NP-4038 | Y | Y | Y |

Fig. 8

COMPUTER AIDED SYSTEM FOR COMPLIANCE WITH CHEMICAL CONTROL LAWS

BACKGROUND OF THE INVENTION

1. Field of the Invention

The present invention generally relates to computer systems and information management systems, and more particularly to a method and apparatus for managing and using information necessary for compliance with domestic and international Chemical Control Laws.

2. Description of Related Art

There are a wide variety of environmental laws (statutes, regulations, etc.) governing the manufacture, importation, distribution and sale of various chemicals in different countries and regions of the world. These laws are generally known as Chemical Control Laws. Chemical Control Laws (CCLs) are designed to protect human health and the surrounding environment from the deleterious effects of hazardous chemicals. Currently, there are approximately 26 countries within North America, Europe and the Pacific Rim that have Chemical Control Laws, with additional regional Durisdictions.

Major CCLs include: the United States Toxic Substances Control Act (TSCA); the Canadian Environmental Protection Act (CEPA); the EEC (European Economic Community) Directive; the Japanese Ministry of International Trade and Industry (MITI) Law; the New Zealand Toxic Substances Act (TSA); the Philippine Law (RA 6969); the Chinese National Environmental Protection Act (NEPA); the Korean Toxic Chemical Control Law (TCCL); and the Australian National Industrial Chemical Notification Act Services (NICNAS). The TSCA and other U.S. hazardous substance laws are discussed further in Patent Cooperation Treaty Application No. PCT/US93/01976.

Chemical Control Laws in general are considered to have two main components: registration requirements and special requirements. Registration requirements have followed two lines of evolution resulting in product-based laws and inventory laws. Both types of registration have been interpreted to have registration (inventory) exemptions for incidental impurities, byproducts, and non-regulated chemicals. Product-based laws require registration of the exact chemical composition of each product (i.e., finished good) with the proper government authorities of the end-use country or region. Registration typically involves submission of a completed form and a filing fee. China and New Zealand, for example, currently employ product-based laws.

The most common Chemical Control Laws are the inventory-based laws. Inventory-based laws have national or regional inventories which are lists of chemicals approved for commercial manufacture, import and sales in the particular country or region of the world. Each chemical component of a product is required to be listed on an inventory prior to commercial manufacture, import or sale. Additions to an inventory are accomplished through registration of the unlisted chemical component and involves the submission of a completed registration form, supplying certain required data, and a filing fee. Inventories can be dynamic or static. The dynamic inventory allows for additions and deletions of listings, while the static inventory is fixed; in other words, static inventories require registration of each new chemical by any company seeking to manufacture, import, distribute or sell the chemical in the country or region of interest, and these registered chemicals will not be added to the static inventory.

With both types of laws, the special requirements regulate aspects of a chemical's or product's use, such as lifecycle restrictions. The special requirements may also include sponsoring of testing for health and environmental effects, restrictions in production volumes, processes, and uses. Special requirements sometimes further include a required export notification to certain government agencies in the end-use countries. Recording and reporting of adverse effects of chemicals on human health or the environment is another special requirement. The diagram of FIG. 1 schematically illustrates the major parts and differences of current Chemical Control Laws as generally described above.

Because of the complexities in registration requirements and special requirements, and since each country or region requires a separate effort, compliance with CCLs, on a regional and global basis, is always an enormously time consuming and resource consuming task. As additional countries and regions develop their own specific Chemical Control Laws, the difficulties with compliance increase. The system disclosed in the aforementioned PCT application addresses specific U.S. laws and regulations, but fails to provide any suggestions for Chemical Control Law compliance that would alleviate the foregoing difficulties.

In light of the foregoing, it would be desirable to provide a method and system to assure compliance with Chemical Control Laws in an automated manner, allowing simple and effective management of Chemical Control Law information on a global basis. It would be further advantageous if the method and system could organize and display relevant CCL information, such as multiple manufacturing and sales statuses of raw materials, reaction product materials, and formula materials.

SUMMARY OF THE INVENTION

It is therefore one object of the present invention to provide a method and system which facilitates compliance with Chemical Control Laws.

It is another object of the present invention to provide such a method and system which can be used to assure CCL compliance on a global or regional scale, wherein different types of registration and special requirements apply in different countries and regions.

It is yet another object of the present invention to provide such a method and system which easily updates overall statuses when changes occur in, e.g., the CCL statuses of chemicals, raw materials, or CCL registration numbers.

The foregoing objects are achieved in an apparatus and process for compliance with domestic and international Chemical Control Laws generally comprises at least one raw material database file, at least one formula database file, at least one manufacturing status database file, at least one sales status database file, at least one regulatory worksheet program, and at least one update program, all residing on a computer system. These files and programs are collectively used to: maintain Chemical Control Law inventories; maintain records of chemical and product Chemical Control Law registrations; provide a basis for automated control of chemical or product manufacturing, distribution, importing and exporting through the generation of country or regional manufacturing and sales status; generate certification letters; generate Chemical Control Law manufacturing and sales statuses for particular countries or regions of the world; provide real-time updating of a chemical's or product's manufacturing and sales status; provide an electronic means of checks and balances to ensure accuracy and compliance with Chemical Control Laws; determine the manufacturing status and sales status faster than retrieval and analysis of hard copy information or non-integrated electronic information; organize and display multiple manufacturing and sales statuses of raw materials, reaction product materials, and formula materials wherein said materials include non-reactive chemicals, reactive chemicals, and mixtures thereof. Chemical Control Law compliance is thus achieved for a large number of chemical products with a minimal amount of effort and staff.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 3a is a graphic representation of a program screen (information displayed on a computer monitor) providing an interface for the formula database file shown in FIG. 2;

FIG. 3b is a graphic representation of a program screen providing an interface for the manufacturing status database file shown in FIG. 2;

FIG. 3c is a graphic representation of a program screen providing an interface for the product sales status database file shown in FIG. 2;

FIG. 4a is a graphic representation of a program screen providing an interface for the regulatory worksheet generated by the worksheet program shown in FIG. 2;

FIG. 4b is a graphic representation of a program screen depicting CCL statuses for a particular raw material;

FIG. 5 is a graphic representation illustrating the fields and records of the raw material database file shown in FIG. 2;

FIG. 6 is a graphic representation illustrating the fields and records of the formula database file shown in FIG. 2;

FIG. 7 is a graphic representation illustrating the fields and records of the manufacturing status database file shown in FIG. 2;

FIG. 8 is a graphic representation illustrating the fields and records of the product sales status database file shown in FIG. 2.

DESCRIPTION OF AN ILLUSTRATIVE EMBODIMENT

One embodiment of the Chemical Control Law Compliance System in accordance with the invention provides an electronic means for storing Chemical Control Law inventory listing information which can be updated by simply downloading government published files or by direct entry. The system is structured so that any changes in the information of the database files will automatically transfer to pertinent files, and the legality of manufacturing, importing or selling a chemical product in a particular CCL jurisdiction (country or region) is determined with Boolean logic. A user interface, together with electronic Chemical Control Law inventories and any additional internally created database entries, enable users to quickly locate desired Chemical Control Law information, display archives, or print reports or forms on demand.

The invention is implemented in a computer system which assists with CCL compliance, wherein the computer system includes a central processing unit (CPU) for carrying out program instructions, a storage medium (e.g., hard disk) for storing the program instructions and database information, at least one user output device, such as a display or printer, and at least one user input device, such as a keyboard. In the embodiment discussed herein, the programming was developed on an IBM (International Business Machine Corp.) AS/400 model midrange computer using RPG III, CL, and SQL (Structure Query Language). Those skilled in the art will appreciate, however, that the system contemplated by the present invention is not limited to this specific computer or these programming languages, but can be developed on a variety of computers with a variety of programming languages.

Figure 1:
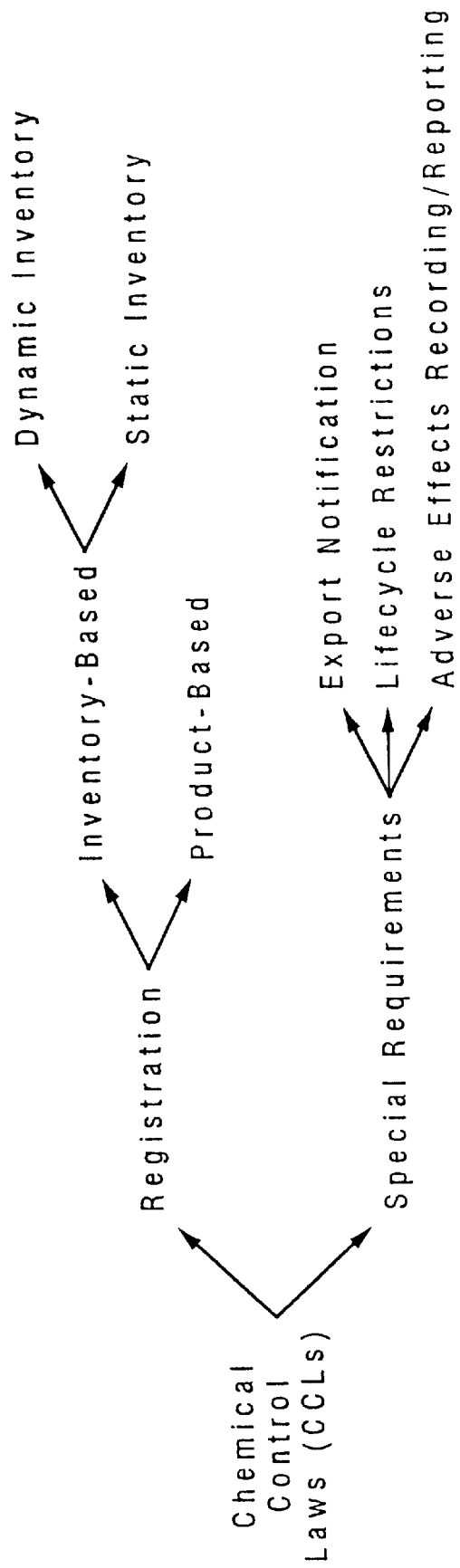
FIG. 1 is pictorial representation of various aspects of different types of existing Chemical Control Laws (CCLs)
Figure 2:
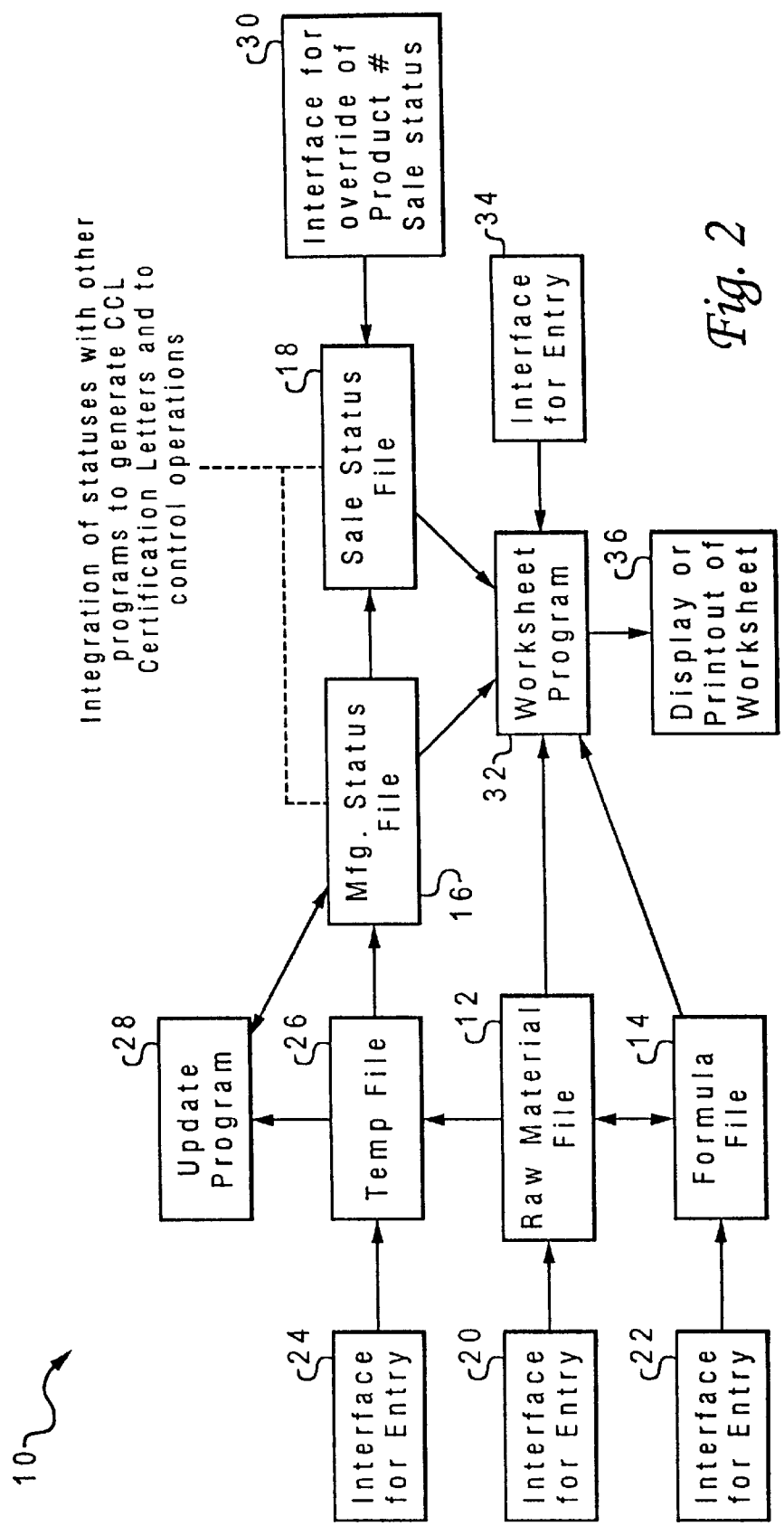
FIG. 2 is a block diagram of one embodiment of a computer system constructed in accordance with the present invention, used to achieve compliance with different Chemical Control Laws.

With reference now to the figures, and in particular with reference to FIG. 2, there is depicted a block diagram of one embodiment of the CCL compliance system 10 of the present invention. CCL compliance system 10 includes several database files 12, 14, 16 and 18 which store information for (i) raw materials, (ii) formulas (recipes for product numbers), (iii) CCL manufacturing statuses for chemicals, raw materials and product numbers, and (iv) CCL sales statuses for chemicals, raw materials and products, as well as chemical names. An interface is provided for each of these files. Interface 20 is used for raw material file 12; interface 22 is used for formula file 14; interface 24 is used for a temporary file 26 which, along with an update program 28, is used to construct manufacturing status file 16; and interface 30 is used for sales status file 18. The information in these files is utilized by programming instructions which determine overall CCL manufacturing and sales statuses for product numbers, and update overall statuses when changes occur in the CCL statuses of chemicals, raw materials, or CCL registration numbers. All information is arranged in a logical fashion by the worksheet program 32, which has a further interface 34. Information from worksheet program 32 can be forwarded on demand to an output device 36 such as a printer or display.

As shown in FIG. 5, database file 12 holding the raw material information contains at least the following fields for each record: a specific raw material number; a raw material description (e.g., supplier tradename); and percent reactive (% of reactive ingredient or purity of the neat raw material). The primary key of database file 12 is the unique six-digit raw material (RM) number. This raw material information is solicited from the raw material suppliers.

As shown in FIG. 6, database file 14 holding the formula (product) information contains at least the following fields for each record: product number; sequence number; RM number; and percent of the raw material. The primary key of this database file is product number and sequence number. The foreign key is the RM number. The information entered is based upon formulas developed in the research lab, using the interface shown in FIG. 3.

As shown in FIG. 7, database file 16 holding the manufacturing status information stores CCL inventory status information associated with a particular CAS number, raw material number, product number (finished good), or premix number (internally manufactured raw material) for each CCL country or CCL region of the world. A CCL manufacturing status is entered as a "Y" (yes) if the item is listed on a particular CCL inventory, as a "N" (no) if the item is not listed on the particular CCL inventory, or as a "U" if the listing is unknown. The fields of this file are: chemical name; type; registration number; RM number; product number; manufacturing (mfg) status #1; manufacturing status #2; etc. This information can be entered using the interface shown in FIG. 3a. The number of statuses can be expanded. The record types of this file are raw material, chemical, finished good (product number) and premix. The primary keys of this database file are RM number for raw materials, type and registration number for a chemical, product number for products, and RM number and product number for premixes.

Initial sources of manufacturing status information for CAS numbers are government published inventories and non-government sources such as the Chemical Abstracts Services STN (Scientific Technical Information Network). Status information is also obtained by a company making direct chemical registrations with the pertinent government agencies. Sources of manufacturing status information for raw materials are obtained from suppliers who have reviewed the pertinent chemical components of a raw material and determined the particular CCL status. If all applicable chemical components of the raw material are listed on a CCL inventory then the manufacturing status is entered into a file as a "Y" (yes, all are listed); otherwise a "N" (all not listed) or "U" (listing is unknown) is entered. The various statuses of the Manufacturing Status File and the Sales Status File (mainly status #1, status #2, etc.) correspond to specific CCL inventories. The relationships are shown in Table 1 below:

TABLE 1

| | |
|---|---|
| Status #1 | U.S. Toxic Substances Control Act (TSCA) |
| Status #2 | Canadian Domestic Substances List (DSL) |
| Status #3 | European Inventory of Existing Chemical Substances (EINECS) |
| Status #4 | Japanese Existing & New Chemical Substances (ENCS) Inventory |
| Status #5 | Australian Inventory of Chemical Substances (AICS) |
| Status #6 | Korean Existing Chemicals List (ECL) |
| Status #7 | Philippine Inventory of Chemicals & Chem. Substances (PICCS) |
| Status #8 | New Zealand Product Registration Status |
| Status #9 | Chinese Product Registration Status |

As shown in FIG. 8, database file 18 holding the sales status information stores CCL sales status information associated with a particular CAS number, RM number, product number (finished good), or premix number (internally manufactured raw material) for each CCL country or region of the world. Information in the manufacturing status file 16 is written directly into the sales status file 18 such that a manufacturing status is equal to the corresponding sale status unless overridden by a direct entry made to the sales status file as shown in FIG. 3b. The fields of this file 18 are: chemical name; type; registration number; RM number; product number; sales status #1; sales status #2; etc. The number of statuses can be expanded to accommodate new CCL laws of developing countries. The record types of this file are raw material, chemical, finished goods (product number/formula), and premix. The primary keys of this database file are RM number for raw materials, type and registration number for a chemical, product number for products, and RM number and product number for premixes.

Figure 9:
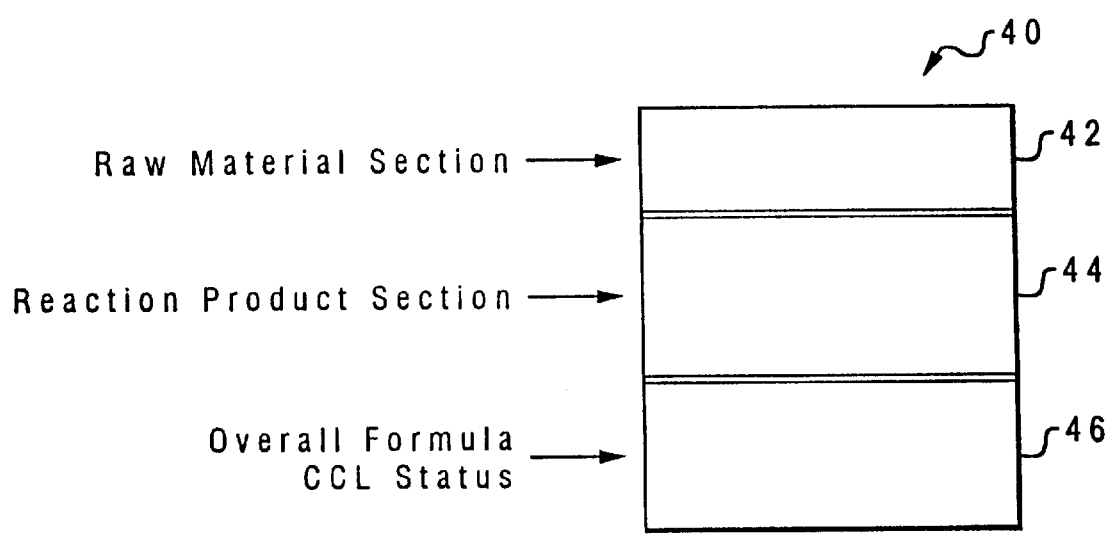
FIG. 9 is a graphic representation illustrating the regulatory worksheet screen layout.

A key program of compliance system 10 is the regulatory worksheet program 32, which displays the regulatory worksheet screen providing the interface for the entry of information, as seen in FIG. 4. The layout of the regulatory status worksheet 40 consists of three sections, as further depicted in FIG. 9. The upper section 42 is the raw material section, the middle section 44 is the reaction product section, and the lower section 46 is the computer-determined block of overall CCL statuses.

Displayed in raw material section 42 of regulatory worksheet 40 for a given product number is information found in formula file 14 (sequence number, RM number, and activity percentage), raw material file 12 (raw material description, percent activity), and manufacturing and sales status files 16 and 18 (RM number, manufacturing and sales statuses). Data element spaces are available for user entry of amounts of RM reacted, number of reaction products, and polymer (answer Y or N). The <CMD 10> function key expands the raw material section of the worksheet and displays a block of CCL statuses of each raw material in the list. See FIG. 4a. The keyboard keys "Page Down" and "Page Up" allow the user to peruse the information.

Displayed in reaction product section 44 of regulatory worksheet 40 for a particular product number is a field for entry of a CAS number or CCL registration number for the reaction product formed during manufacture of the product, and the information from manufacturing status file 16 and sales status file 18(the chemical name corresponding to the cas number or CCL Registration, and the individual CCL country or region manufacturing and sales statuses). The user, by placing the cursor in the middle section, can scroll through the CCL manufacturing and sales statuses for the reaction product with the "Page Up" and "Page Down" keys of the keyboard. Entry of the CAS number or CCL registration number for the U.S. TSCA will repeat the entry for all other countries unless overridden. Types such as CAS and ACC precede the entry of the CAS number and CCL registration numbers and allow the programming to locate the correct records of the manufacturing and sales status files.

Reaction section 44 can accommodate more than one reaction product being formed during the manufacture of a product. Additional fields appear for this situation by changing the "number of reaction products" of the raw material section of the worksheet from "1" to a greater integer. Entry of a "0" by the user indicates that no reaction is occurring and that the product is simply a mixture of raw materials. The reaction product section in this situation will not be displayed.

Displayed in the overall CCL status section 46 of worksheet 40 is a block of overall statuses for the product number. Upon completing the setup of the worksheet screen, the user will strike the "enter" key on the keyboard (also referred to as the "return" or "transmit" key) which prompts worksheet program 32 to review the sales statuses of the raw materials and all reaction products of the particular product number. The review is conducted separately for each CCL country or region and the block of overall mfg and sales status are determined. The program updates the manufacturing and sale status files from a temporary file for the particular product number. The regulatory worksheet program also performs regulatory calculations such as the "Charged Wt %" and the "Incorporated Wt %" calculations used for determining the correct chemical names for polymers in many CCLs. All information is displayed on the worksheet screen for user appraisal and can be printed on demand. The notation used for the manufacturing and sales statuses of raw materials, premixes, and products are:

[Country or Region] [Inventory Name]: Mfg X Sale X where "Mfg" means the manufacturing status, "Sale" means the sales status, and X can be Y (Yes—listed), N (No—not listed), or U (Unknown—listing status not known). Groups of statuses are arranged into blocks for easy viewing of the CCL statuses of raw materials, premixes, or product numbers. An example of a complete block of statuses for a product are shown below:

"U.S. TSCA:Mfg Y Sale Y Canada DSL:Mfg Y Sale Y Europe EINEC:Mfg N Sale N Japan ENCS:Mfg N Sale N Korea ECL:Mfg U Sale U Australia AICS:Mfg N Sale N Philippines PICCS:Mfg N Sale N New Zealand:Mfg N Sale Y China:Mfg N Sale N"

If all of the sales statuses of a product's raw materials, premixes (if applicable), or reaction products (if applicable) are "Y" for a specific country or region of the world, then worksheet program 32 generates an overall formula CCL status of "Mfg Y Sale Y". In any other instance, the statuses would be "Mfg N Sale N" unless the sales status had been overridden by direct entry into sales status file 18 for the product number or premix, in which case the overall formula status may be "Mfg N Sale Y". The regulatory meaning of the manufacturing and sales status for raw materials and products are important because they indicate whether or not an individual raw material or a product can be manufactured, imported, or sold commercially in a given CCL country or region of the world without requiring potentially costly registration.

An overall commercial manufacturing and sales status for a raw material of "Mfg Y Sale Y" for a given CCL country or region indicates that all applicable chemical components are listed on the specific country regional CCL inventory. The raw material can be used for commercial manufacture, import, or sale in the indicated country or region of the world. No chemical registration is required.

An overall commercial manufacturing and sales status for a raw material of "Mfg N Sale N" for a given CCL country or region indicates that all applicable chemical components are not listed on the specific country regional CCL inventory. The raw material can only be manufactured, imported, or sold for non-commercial research and development use only in the indicated country or region of the world. Further chemical registration is required for the non-listed chemical components prior to commercial manufacture, import, or sale of the raw material.

An overall commercial manufacturing and sales status for a product of "Mfg Y Sale Y" for a given CCL country or region indicates that all raw materials and reaction products are listed on the specific country regional CCL inventory. The product can be used for commercial manufacture, import, or sale in the indicated country or region of the world. No chemical registration is required.

An overall commercial manufacturing and sales status for a product of "Mfg N Sale N" for a given CCL country or region indicates that all raw materials and reaction products are not listed on the specific country regional CCL inventory. The product can only be manufactured, imported, or sold for non-commercial research and development use in the indicated country or region of the world. Further chemical registration is required for the non-listed chemical components prior to commercial manufacture, import, or sale of the product.

An overall commercial manufacturing and sales status for a product of "Mfg N Sale Y" is the result of a sales status being overridden in the sale status file. A sales status override of "Y" is used for products commercially sold in a CCL country or region of the world having an inventory-based law. This override is for products in which a nonlisted (destination country) reactant is consumed by chemical reaction during manufacture to create a reaction product which is listed. In this situation this status indicates that the product can be sold in the destination site but not necessary manufactured. If the overall commercial manufacturing and sales status is "Mfg N Sale Y" for a product intended for a CCL country or region having a product-registration law, this status indicates that product registration has been completed and that the product can be commercially manufactured, imported, and sold in that particular CCL country or region.

Another key program of global compliance system 10 is update program 28. Any status change entered into the manufacturing status file 16 or sale status file 18 prompts update program 28 to again determine the formula overall CCL statuses. Temporary file 26 containing the changed status information for a RM number, CAS number, or a country specific registration number is compared to the status information in the manufacturing file. If the information is not equivalent, the overnight update program runs to determine the new overall formula CCL status for affected products or premixes during off-hours. The update feature of the system is particularly useful in that a company employee responsible for registering an unlisted chemical (a raw material or a reaction product of a product number) would, through an interface, change the corresponding CCL manufacturing status in the manufacturing status file record from "N" or "U" to "Y" upon completion of the CCL country or region registration requirements (inventory-based law). The update program would then review the worksheet raw materials and reaction product of all affected product number(s) to generate a new block of overall CCL statuses for each. If the registration was in a country or region which has a product-registration law, the employee would update the appropriate sales status file record for the product number from "N" or "U" to "Y".

This feature results in huge cost and time savings considering that new chemicals are constantly being added to the dynamic CCL inventories, and other chemicals are being removed. In addition, new combinations of raw materials and reaction products are continually being developed, resulting in a need to constantly review the overall CCL statuses of formula. A change in a status of a raw material or reaction product CAS number could result in thousands of changes in the overall formula statuses. This problem is particularly troublesome for companies with large product line. Continually updating the information manually is nearly impossible and companies often will fall out of compliance with a particular CCL resulting in fines. The CCL manufacturing and sale statuses of the raw materials are useful for determining whether or not a raw material can be purchased or imported for commercial purposes. It has also been shown to be useful for controlling order entry, shipping, and manufacture of a companies products (finished goods) so that a company remains both compliant with both domestic and international Chemical Control Laws.

The global compliance system is an integral part of a global company with a large product line seeking to be compliant with Chemical Control Laws. The calculated CCL statuses are useful for certifying for customers that a product is compliant with specific CCLS. Printout of the block of overall status for a particular product in a letter format serves as certification to customers that the chemical component of a product are listed on a particular country regional inventory. The block of overall statuses for a product serves as a quick on-screen check for order entry, manufacturing, or sales employees whether or not a product can be manufactured, imported, or sold in a particular CCL country or region. The block of statuses can also be linked to related systems in order entry, manufacturing, shipping to provide greater control of these operations.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the invention might also be applied to compliance with biological control laws, or control laws such as those promulgated by the Food and Drug Administration, including packaging and pharmaceutical regulations or regulations dealing with waste disposal, or Department of Transportation laws. It is therefore contemplated that such modifications can be made without departing from the spirit or scope of the present invention as defined in the appended claims.

We claim:

1. A method of facilitating compliance with a plurality of substance control laws of different jurisdictions having varying requirements, comprising the steps of:

creating a substance list for a product, and compliance information associated with the substance list, based on database information located in a computer system;

determining compliance statuses for the product in at least two jurisdictions, using the computer system, based on the substance control laws; and forwarding the compliance statuses to an output device of the computer system.

2. The method of claim 1 wherein the substance control laws are chemical control laws, and said creating step includes the step of creating a list of raw material in the product, and compliance information associated with the raw material list.

3. The method of claim 1 wherein said creating step includes the steps of:

obtaining substance information from at least one formula database file located in the computer system; and obtaining compliance information from at least one status database file located in the computer system, based on the substance information.

4. The method of claim 1 further comprising the step of updating the compliance statuses based on a change in the compliance information.

5. The method of claim 1 wherein said step of determining compliance statuses includes the steps of:

determining manufacturing statuses for the product in the at least two jurisdictions; and determining sales statuses for the product in the at least two jurisdictions.

6. The method of claim 1 wherein said step of determining compliance statuses includes the steps of:

determining at least one compliance status for a country; and determining at least one compliance status for a region.

7. The method of claim 1 wherein said step of forwarding the compliance statuses to an output device of the computer system comprises the step of displaying the compliance statuses on a monitor of the computer system.

8. The method of claim 1 further comprising the step of generating certification letters for the jurisdictions based on the compliance statuses.

9. The method of claim 2 wherein said creating step further includes the step of creating a list of reaction product.

10. The method of claim 9 wherein said step of determining compliance statuses includes the steps of:

determining manufacturing statuses for the product in the at least two jurisdictions; and determining sales statuses for the product in the at least two jurisdictions.

11. A computer system comprising:

a user output device;

means for storing compliance information for substances, based on substance control laws of different jurisdictions having varying requirements;

means for processing program instructions to determine compliance statuses for a product, based on said compliance information; and at least one user input device for controlling said processing means to forward the compliance statuses to said output device.

12. The computer system of claim 11 wherein said program instructions include means for generating a regulatory worksheet having the compliance information and the compliances statuses.

13. The computer system of claim 11 wherein the substance control laws are chemical control laws, and said program instructions include means for creating a list of raw material in the product, and compliance information associated with the raw material list.

14. The computer system of claim 11 wherein said storing means has at least one formula database file and at least one status database file.

15. The computer system of claim 11 wherein said storing means further stores said program instructions.

16. The computer system of claim 11 wherein said program instructions include means for updating the compliance statuses based on a change in the compliance information.

17. The computer system of claim 11 wherein said program instructions include means for determining manufacturing statuses for the product in the jurisdictions, and for determining sales statuses for the product in the jurisdictions.

18. The computer system of claim 11 wherein said program instructions include means for generating certification letters for the jurisdictions based on the compliance statuses.

19. The computer system of claim 13 wherein said program instructions further include means for creating a list of reaction product.

20. The computer system of claim 19 wherein said program instructions include means for determining manufacturing statuses for the product in the jurisdictions, and for determining sales statuses for the product in the jurisdictions.

* * * * *